(12) United States Patent
Ackroyd et al.

(10) Patent No.: US 11,650,797 B2
(45) Date of Patent: May 16, 2023

(54) CLOUD PORTABILITY CODE SCANNING TOOL

(71) Applicant: JPMorgan Chase Bank, N.A., New York, NY (US)

(72) Inventors: Richard Ackroyd, Ferndown (GB); Matthew Chaddock, Bournemouth (GB); Helen Paget, Bournemouth (GB); Kenny Rodman, Bournemouth (GB); Kin Choi Yeung, Bournemouth (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 88 days.

(21) Appl. No.: 17/234,334

(22) Filed: Apr. 19, 2021

(65) Prior Publication Data

US 2021/0326121 A1 Oct. 21, 2021

Related U.S. Application Data

(60) Provisional application No. 63/011,532, filed on Apr. 17, 2020.

(51) Int. Cl.
  *G06F 9/44* (2018.01)
  *G06F 8/33* (2018.01)
  *G06F 8/41* (2018.01)
  *G06F 8/34* (2018.01)

(52) U.S. Cl.
  CPC ............ *G06F 8/33* (2013.01); *G06F 8/34* (2013.01); *G06F 8/433* (2013.01)

(58) Field of Classification Search
  CPC ...................................................... G06F 8/433

USPC ........................................................ 717/113
See application file for complete search history.

(56) References Cited

U.S. PATENT DOCUMENTS

| | | | | |
|---|---|---|---|---|
| 8,607,200 | B2 * | 12/2013 | Kunze ................. | G06F 9/44536 717/124 |
| 9,588,820 | B2 * | 3/2017 | Ravi ...................... | G06F 9/5072 |
| 9,595,054 | B2 * | 3/2017 | Jain ........................ | G06F 9/5072 |
| 9,619,371 | B2 * | 4/2017 | Adderly ..................... | G06F 8/65 |
| 9,772,830 | B2 * | 9/2017 | Balasubramanian ..... | G06F 8/60 |
| 10,411,975 | B2 * | 9/2019 | Martinez ................ | H04L 41/40 |
| 10,534,701 | B1 * | 1/2020 | Pande ................. | G06F 11/3688 |

(Continued)

FOREIGN PATENT DOCUMENTS

| | | | | |
|---|---|---|---|---|
| WO | WO-2014088398 A1 * | 6/2014 | .......... | G06F 11/3414 |
| WO | WO-2017144432 A1 * | 8/2017 | .......... | H04L 41/046 |

OTHER PUBLICATIONS

Stefan Kolb; "On the Portability of Applications in Platform as a Service"; Contributions of the Faculty Information Systems and Applied Computer Sciences of the Otto-Friedrich-University Bamberg—2019.*

(Continued)

*Primary Examiner* — Francisco J Aponte
(74) *Attorney, Agent, or Firm* — Greenblum & Bernstein, P.L.C.

(57) ABSTRACT

Embodiments disclosed herein provide for systems and methods for scanning application code to determine cloud platform portability. The systems and methods provide for a rules processing engine configured to perform a portability analysis on the application code and a list of cloud platform dependencies, and returns a score indicating the "stickiness" of the application code to a particular cloud platform.

20 Claims, 4 Drawing Sheets

(56) References Cited

U.S. PATENT DOCUMENTS

| | | | |
|---|---|---|---|
| 10,592,392 B2* | 3/2020 | Breitgand | G06F 11/3624 |
| 11,055,066 B2* | 7/2021 | Junior | G06F 9/5072 |
| 11,288,163 B1* | 3/2022 | Kowalewski | G06F 11/3428 |
| 2014/0012562 A1* | 1/2014 | Chang | G06F 11/3461 703/22 |
| 2015/0032894 A1* | 1/2015 | Rosensweig | G06F 9/5088 709/226 |
| 2015/0341240 A1* | 11/2015 | Iyoob | G06Q 30/0629 709/201 |
| 2016/0094477 A1* | 3/2016 | Bai | G06F 9/5083 709/226 |
| 2016/0112510 A1* | 4/2016 | Bai | G06F 9/45558 709/217 |
| 2017/0279692 A1* | 9/2017 | Llagostera | H04L 41/5051 |
| 2017/0373935 A1* | 12/2017 | Subramanian | G06F 9/5072 |
| 2018/0121320 A1* | 5/2018 | Dolby | G06F 11/3604 |
| 2018/0191599 A1* | 7/2018 | Balasubramanian | G06F 9/5072 |
| 2018/0253373 A1* | 9/2018 | Mathur | G06F 11/3664 |
| 2019/0102411 A1* | 4/2019 | Hung | G06N 5/025 |
| 2019/0213104 A1* | 7/2019 | Qadri | G06F 11/3608 |
| 2019/0377611 A1* | 12/2019 | Khan | G06F 9/5038 |
| 2020/0125404 A1* | 4/2020 | Klein | G06F 9/54 |
| 2020/0274900 A1* | 8/2020 | Vaishnavi | H04L 63/0815 |
| 2021/0349745 A1* | 11/2021 | Kelly | G06F 11/302 |
| 2021/0373860 A1* | 12/2021 | Khan | G06F 9/546 |

OTHER PUBLICATIONS

Elena Markoska, et al. "Cloud Portability Standardization Overview"; MIPRO 2015, May 25-29, 2015, Opatija, Croatia—IEEE.*

Beniamino Di Martino et al. "Cloud Portability and Interoperability Issues and Current Trends"; SpringerBriefs in Computer Science—Springer 2015.*

Justice Opara-Martins et al. "Critical analysis of vendor lock-in and its impact on cloud computing migration: a business perspective"; Opara-Martins et al. Journal of Cloud Computing: Advances, Systems and Applications 2016.*

* cited by examiner

Code Analyzer Report

Cloud Portability Analysis Report

Application X

Dependency Map 410

Analysis Summary and Recommendation 420

- 2 POM, 2 classes and 1 API dependencies fond with potential vendor lock-in
- Consolidate external services connections
- Remove un-used dependency import pom.xml (gap-aim-deployer)
- Convert vendor API connections to use SDKs

Dependency Details 430

| Type | Dependency Name | Source | Effort |
|---|---|---|---|
| POM | deployer... | pom.xml | Low |
| POM | cloud-connector... | pom.xml | Low |
| Class | gaia spring... | • com/bankABC/cloud/...<br>• com/bankABC/cloud/... | Medium |
| API | http://bucket... | • com/bankABC/cloud/... | Low |

440 | 7 | Medium Risk

Figure 4

CLOUD PORTABILITY CODE SCANNING TOOL

CROSS REFERENCE TO RELATED APPLICATIONS

The application claims priority to U.S. Provisional Application 63/011,532, filed Apr. 17, 2020, the contents of which are incorporated by reference herein in their entirety.

FIELD OF THE INVENTION

The present invention relates generally to cloud platform portability, and more particularly to a system and method for implementing a cloud portability scanning tool that indicates how "sticky" application code is to a given cloud platform.

BACKGROUND OF THE INVENTION

Many applications are migrating to the cloud for increased availability, cost savings, and resiliency. However, this is leading to tight coupling and vendor lock-in for many applications. With the recent maturity in cloud offerings, many organizations are migrating workloads to internal and public cloud systems and trying to do so at a high speed. Although this makes good business sense, as it allows the organization to make the most of availability, cost savings elasticity, and resiliency, those workloads being developed and deployed to the cloud are typically built to serve a functional requirement with little or no regard towards the cloud/infrastructure portability of the given workload. This raises the risk of vendor lock-in by implementing services, knowledge, and code in a way that makes it more difficult to move.

With the current rate of delivery to cloud-based platforms, organizations will soon have a significant number of applications deployed across different vendors. If there is no consideration for portability across the different applications, the ability to respond to change is reduced and impaired.

Accordingly, there is a need for a cloud portability code scanning tool that indicates how "sticky" application code is to a given cloud platform.

SUMMARY OF THE INVENTION

One aspect of the present disclosure relates to a cloud portability code scanning tool that indicates how "sticky" application code is to a given cloud platform. According to an embodiment, developers may use the cloud portability code scanning tool to score application code against a cloud portability index. In particular, the innovative tool may indicate to the developer that the code includes dependencies upon cloud provider artifacts/binaries that would could make the application "locked-in" to a particular cloud provider. According to an embodiment, the cloud portability code scanning tool may be introduced into the various stages of the overall software development lifecycle (SDLC). For example, the cloud portability code scanning tool may be implemented as the developer begins to write the application code to ensure that the developer avoids any undesired vendor lock-in from the outset. This could save the developer expensive and time-consuming refactoring later on in the SDLC. According to an embodiment, the tool may be incorporated during the "Code/Build" phase with a plug-in for an integrated development environment (IDE) (e.g., IntelliJ) to allow developers to scan their code at compile/build time. In addition, it may also be added later in the lifecycle at the "Scan" phase and integrated into the user interface of other code scanning tools (e.g., SonarQube). The plug-in may provide a graphical user interface view of the cloud portability scanning results alongside the core scanning results provided by the scanning product. This integration with additional scanning tools also allows the aggregation of the cloud portability scanning metrics in line with organizational hierarchy.

According to an embodiment, a system for scanning application code to determine cloud platform portability may include: an integrated design environment configured to receive the application code; a harvesting engine configured to receive at least one list of cloud platform dependencies; a graphical user interface configured to display a cloud platform portability determination to an end user; and a rules processing engine comprising a computer processor, coupled to the integrated design environment, the harvesting engine and the graphical user interface, the computer processor configured to perform the steps of: receiving the application code from the integrated design environment; receiving the at least one list of cloud platform dependencies from the harvesting engine; performing an analysis between the received application code and the at least one list of cloud platform dependencies; generating a cloud platform portability determination based on the analysis, wherein the cloud platform portability determination comprises a portability index that represents a number of platform or product specific dependencies present in the application code; and transmitting, to the graphical user interface, the cloud platform portability determination.

According to another embodiment, a method for scanning application code to determine cloud platform portability may include the steps of: receiving application code from an integrated design environment; receiving at least one list of cloud platform dependencies from a harvesting engine; performing, via a rules processing engine, an analysis between the received application code and the at least one list of cloud platform dependencies; generating, via the rules processing engine, a cloud platform portability determination based on the analysis, wherein the cloud platform portability determination comprises a portability index that represents a number of platform or product specific dependencies present in the application code; and transmitting, to a graphical user interface, the cloud platform portability determination.

Further, the cloud portability code scanning tool also provides the following technical advantages: (i) identification of potential tight coupling to vendor specific products, (ii) highlighting where architecture does not follow good design patterns, (iii) providing recommendations for reducing tight coupling to external dependencies, (iv) providing visual representation of the architecture of the scanned application, and (v) facilitating product migration by clearly identifying and displaying where vendor dependencies are present.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 4 is an exemplary user interface, according to an embodiment of the present invention.

DETAILED DESCRIPTION OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

Figure 1:
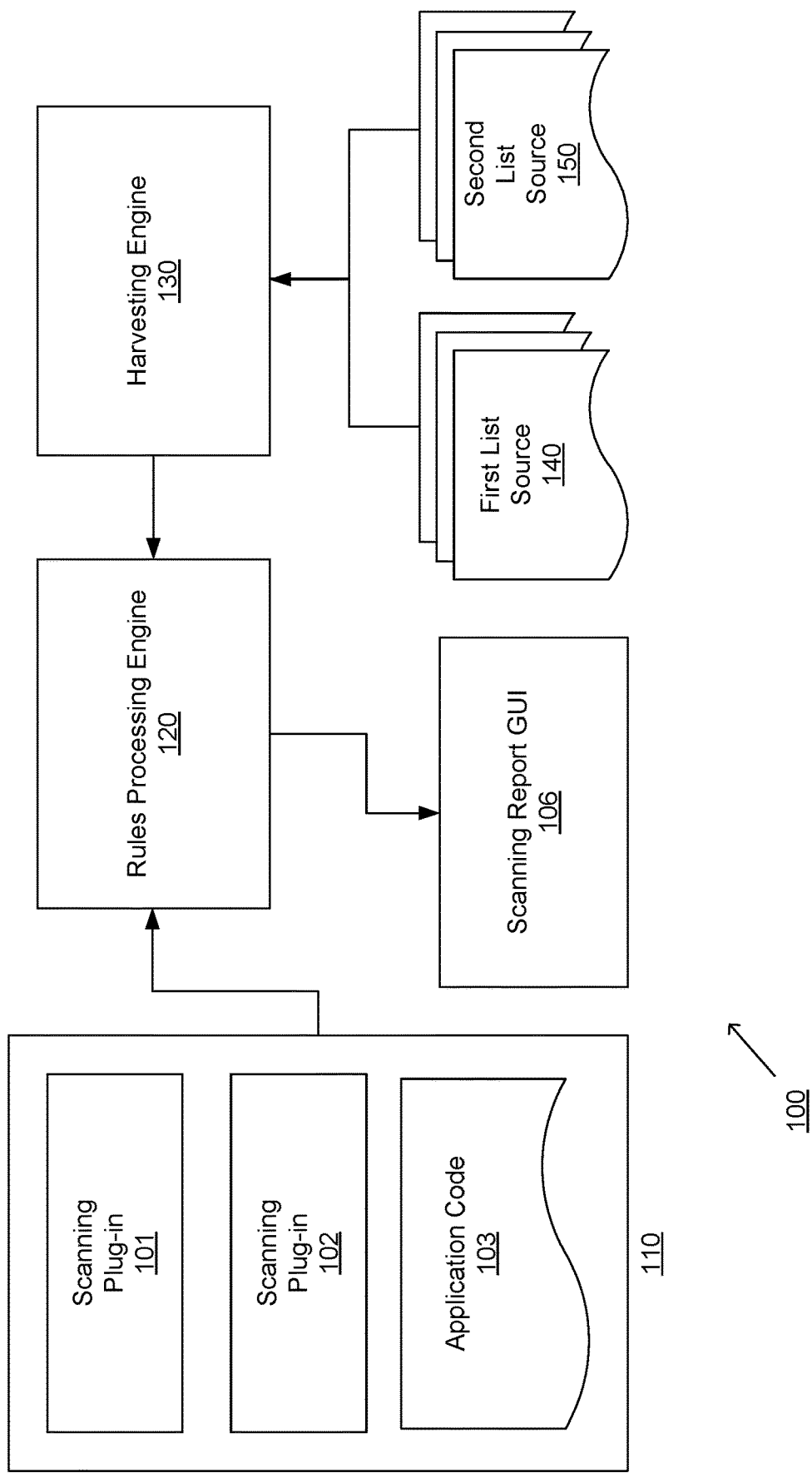
FIG. 1 illustrates a system implementing a cloud portability code scanning tool according to an exemplary embodiment of the present invention.

FIG. 1 illustrates a system implementing a cloud portability code scanning tool according to an exemplary embodiment of the present invention. As depicted in FIG. 1, a system 100 includes an integrated development environment (IDE) 110, a rules processing engine 120, a harvesting engine 130, a first list source 140, a second list source 150, and a scanning report graphical user interface (GUI) 160.

According to an embodiment, the IDE 110 may include scanning plug-ins 101 and 102, and application code 103. At least one of the scanning plug-ins may be configured to scan the application code 103. Scanning plug-ins may run a static code analysis, providing flexibility to developers in the approach used for scanning. A particular scanning plug-in (e.g., scanning plug-in 101 or scanning plug-in 102) may be selected to scan the application code 103 based on the format associated with the application code 103. For example, if the application code 103 is associated with a Project Object Model (POM) file, then the scanning plug-in 101 may be utilized. According to another example, if the application code 103 is associated with other file formats, then the scanning plug-in 102 may be utilized. According to an embodiment, after either of the scanning plug-ins scan the application code 103, the application code 103 may be provided to the rules processing engine 120.

The rules processing engine 120 may implement an algorithm in order to provide an analysis between dependencies and project structure from the application code 103 and a list of issues to watch out for from the harvesting engine 130. In particular, the rules processing engine 120 performs a scan of the application code against the list from the harvesting engine 130 and returns a score indicating the "stickiness" of the application code 103 to a particular cloud platform.

For example, assuming the application code 103 is a JAvA® class file, the rules processing engine 120 may execute an algorithm that searches each JAVA® class file for any imports from dependencies of a specific cloud provider. Similarly, assuming the application code 103 is a JAVA® POM file, the rules processing engine 120 may execute an algorithm that searches the POM file for dependency inclusion entries from a specific cloud provider. Assuming the application code 103 does not use dependency management to connect to a specific cloud provider, the rules processing engine 120 may execute an algorithm that searches the codebase for APIs of a specific cloud provider. According to an embodiment, the list of dependencies may be drawn from a dependency management systems and APIs from SWAGGER® definitions. The list is therefore dynamically updated on each run of the rules processing engine 120. In this way, assessing the frequency and distribution of such dependencies throughout the codebase may indicate a comparative level of stickiness to a specific cloud platform.

According to another embodiment, the rules processing engine 120 may also execute an algorithm that searches each JAVA® class file for any imports from a key list of database dependencies. For example, the list of dependencies may be hard-wired to check for JAVA® foundation classes plus the main Oracle classes, e.g., any class residing in the following packages: java.sql; javax.sql; java.persistence. Database imports in the JAVA® code are not necessarily bad but may indicate a possible egress point to an external resource. The database access should beneficially be contained into one cohesive part of the code base. If database access is wide spread across the code base, the portability of the application code 103 substantially decreases. An example of a database import in the JAVA® code may include: import java.sql.SQLException.

According to an embodiment, the rules processing engine 120 may be deployed to the particular cloud platform as a representational State Transfer (REST) application programming interface (API) that can be called by one of the scanning plug-ins.

According to an embodiment, the harvesting engine 130 may poll the first and second list sources 140 and 150, respectively, in order to retrieve an appropriate dependencies list. While two exemplary list sources are shown in FIG. 1, any number of list sources may be implemented. For example, the first list source 140 may maintain a list of cloud dependencies using SWAGGER® definitions. As such, cloud providers such as AMS and Azure may be identified. Further, the second list source 150 may maintain a list of cloud dependencies using other dependency repository systems, such as a Maven repository, e.g., "MVN Repository." In addition, a manual list of cloud dependencies may also be used to allow for crowd-sourced dependency identifiers.

Harvesting engine 130 may continuously check for updates from third party vendors. According to an embodiment, the first and second list sources 140 and 150 are regularly updated in order to ensure that the lists of cloud dependencies remain evergreen. Further, the harvesting engine 130 analyzes data from the available sources, e.g., the first and second list sources 140 and 150, by (i) bringing in the dependency names and versions, (ii) removing duplicates in the dependencies, and (iii) providing a clean and current ruleset, which may then be provided to the rules processing engine 120. As such, the harvesting engine 130 may enable the code scanner to stay current without regular manual maintenance. First and second list sources 140 and 150 may include known documentation locations. Additional cloud providers may be added as a system evolves and expands. Further, additional types of content and different markers and flags may be highlighted that indicate a level of coupling to a particular cloud provider.

According to an embodiment, the harvesting engine 130 may be deployed to the particular cloud platform as a REST API that may be called by the rules processing engine 120.

According to an embodiment, results from the rules processing engine 120 may be displayed in textual and graphical format in the scanning report GUI 160 and may include the following data, information, and recommendations from Table 1 below based upon the results of the application scan.

TABLE 1

| Metric | Description | Recommendation |
| --- | --- | --- |
| Portability Index | An integer value based upon the number of platform or product specific dependencies present in the code | High numbers are flagged as risks to portability |
| Dependency Location Report | A list of the classes where the dependencies are present | Recommendations are made based upon the spread of the discovered locations; if they exist across multiple files then the tool recommends the use of a design pattern to abstract them to a single file |
| Service Usage Report | A list of the services found by the scan | A map of equivalent services supported by alternative providers in provided to the user with key attributes of each supplied to allow the user to assess whether an alternative platform and service would be beneficial. Recommended services highlighted based on code scan |
| Pricing Report | The current pricing model for the platform being used by the scanned application | A map of pricing options from alternative platforms with cheaper viable options highlighted (Cross referenced with the Service Usage Map to ensure equivalent services are available by the cheaper platform) |
| API Detection | Report of where APIs are used instead of SDKs | Recommend SDK use in place of APIs where applicable, with links and relevant information supplied where available |
| Portability Effort | Estimated person hours that would be required to move the application from one platform to another | For a high number of hours, make recommendations to lower the effort based on the above reports; supply the estimated effort for portability if the specified recommendations are met |
| Application Dependencies | Highlight dependencies on other applications | Where other application scanning reports exist, link to the results to view the portability of that application |

Figure 2:
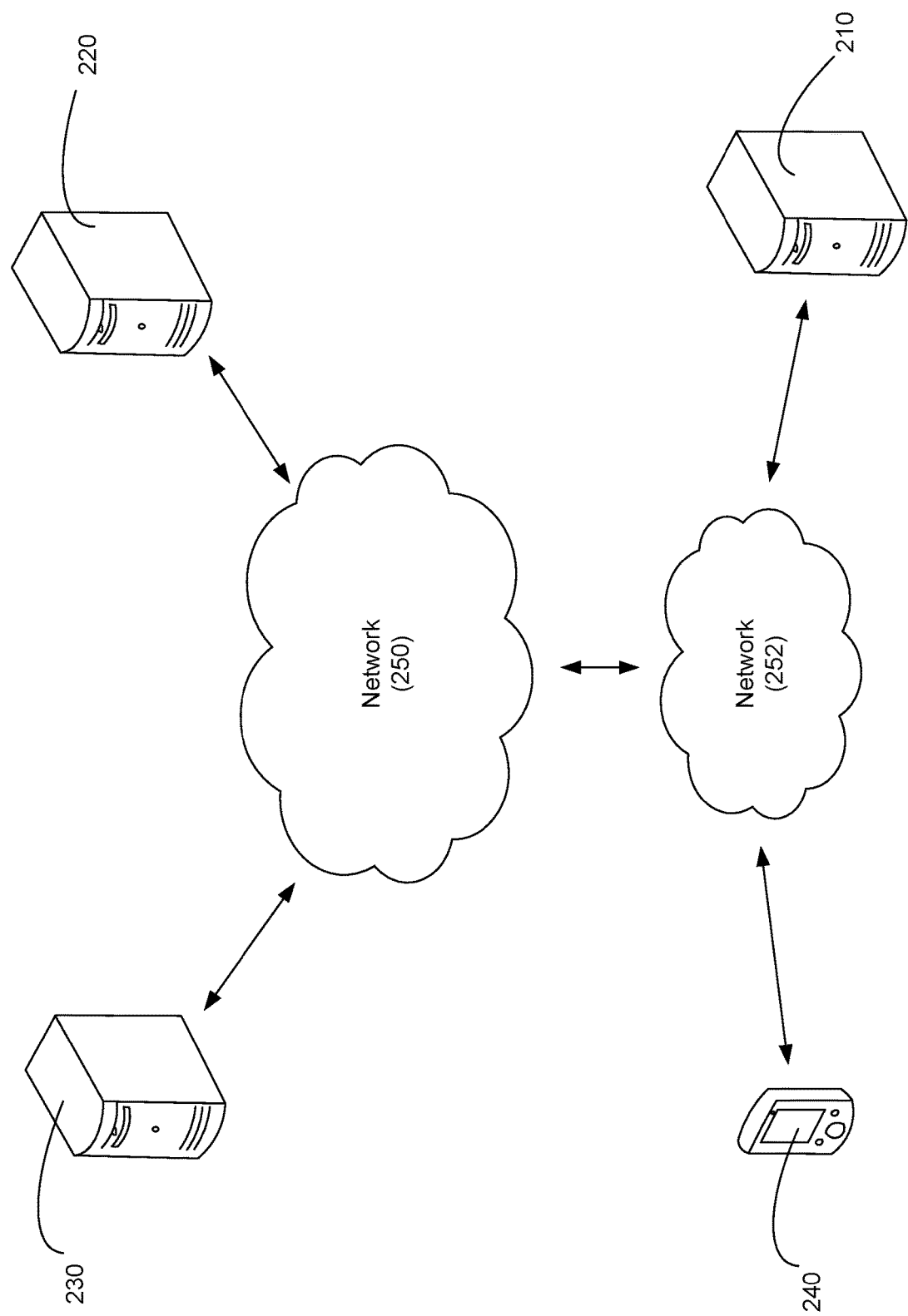
FIG. 2 illustrates a system implementing a cloud portability code scanning tool according to another exemplary embodiment of the present invention.

FIG. 2 illustrates a system implementing a cloud portability code scanning tool according to another exemplary embodiment of the present invention. As shown in FIG. 2, the system may include one or more computing devices, such as servers 210, 220, 230, and personal computing device 240. The system may also include one or more networks 250, 252 that connect the various computing devices shown in FIG. 2. Although only one personal computing device 240 and three servers 210, 220, 230 are shown in FIG. 2 to illustrate principles of the invention, in practice additional devices and servers may be involved in implementation of various embodiments of the invention. The networks may comprise, for example, any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network.

The system implementing a cloud portability code scanning tool may be embodied primarily in a server 210, which executes the methods described above for scanning the application code. The system may also include, or interface with, servers 220 and 230 that store and provide data that is input to the server 210. The system may be accessed and controlled by a personal computing device 240 which may comprise a mobile phone, tablet computer, laptop computer, or desktop computer, for example.

Figure 3:
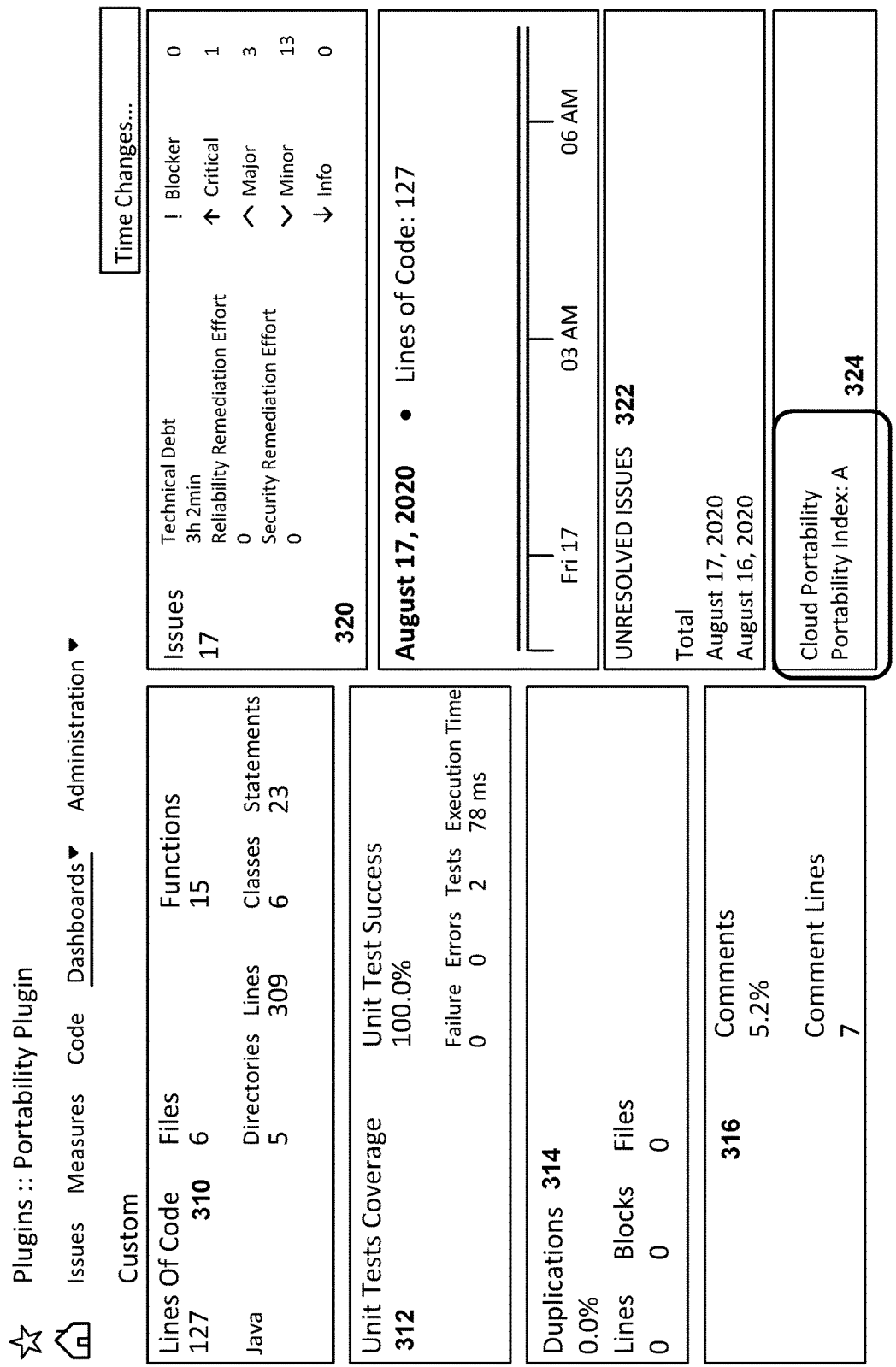
FIG. 3 is an exemplary user interface, according to an embodiment of the present invention.

FIG. 3 is an exemplary user interface, according to an embodiment of the present invention. FIG. 3 illustrates an exemplary dashboard that provides detailed analytics relating to cloud portability. At 310, Lines of Code, Files and Functions may be provided. Unit Tests Coverage may be provided at 312. This may include Unit Test Success, failures, errors, tests and execution time. Duplications may be identified at 314 and Comments referenced at 316. FIG. 3 may also identifies Issues at 320. This may include an assessment of Technical Debt, Reliability Remediation Effort and Security Remediation Effort. A summary of issues may be provided graphically as Blocker, Critical, Major, Minor and Informational. Other metrics may be provided. At 322, a summary of unresolved issues may be provided. An overall cloud portability index is provided at 324. The index may include a grade, numeric or alphanumeric representation and/or other indicia.

Along with the overall cloud portability index, underlying data may be provided which may include details relating to various code and other dependencies. This may also include an indication of how dependencies are spread across a portfolio. In addition, the application code may be highlighted with dependency indicators and data. For example, a user may visually determine how clustered or spread out dependencies are throughout the code. Hierarchy information may also be provided to ascertain an organizational hierarchy of the code and other data.

Along with the code, an embodiment of the present invention may also provide portability information relating to configuration, application and/or environment data. This may provide details concerning portability restrictions relating to how the code is configured and/or executed. Such portability restrictions may include external and internal dependencies.

FIG. 4 is an exemplary user interface, according to an embodiment of the present invention. FIG. 4 illustrates a cloud portability analysis report for an application. For Application X, the exemplary interface may include Dependency Map 410, Analysis Summary and Recommendation 420 and Dependency Details 430. Dependency Map 410 graphically illustrates dependencies and corresponding connections/relationships. Analysis Summary and Recommendation 420 provides details relating to dependencies, potential vendor lock-in, external services connections, un-used dependency imports, API connections, etc. Dependency Details 430 may include type, dependency name, source and effort. Other dependency data may be provided and illustrated. An overall risk assessment may be provided at 440 as indicated by a numerical representation. In this example, an overall risk of 7 represents medium risk. Other scales and metrics may be applied to represent risk.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, JAVA®, Modula-2, Pascal, Prolog, REXX, Visual Basic, and/or JavaScript®, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for scanning application code to determine cloud platform portability, the system comprising:
   an integrated design environment configured to receive the application code;
   a harvesting engine configured to receive at least one list of cloud platform dependencies, to receive intermittent updates to the at least one list of cloud platform dependencies at a predetermined interval, to identify dependency names and versions in the at least one list of cloud platform dependencies, and to remove duplicates present in the at least one list of cloud platform dependencies;

a graphical user interface configured to display a cloud platform portability determination to an end user, and to display a dependency map indicating the cloud platform dependencies; and a rules processing engine comprising a computer processor, coupled to the integrated design environment, the harvesting engine and the graphical user interface, the computer processor configured to perform the steps of:
receiving the application code from the integrated design environment;
receiving the at least one list of cloud platform dependencies from the harvesting engine;
performing an analysis between the received application code and the at least one list of cloud platform dependencies;
identifying one or more vendor lock-in dependencies in the application code based on the analysis;
generating a cloud platform portability determination based on the analysis, wherein the cloud platform portability determination comprises a portability index that represents a number of platform or product specific dependencies present in the application code; and
transmitting, to the graphical user interface, the cloud platform portability determination.

2. The system of claim 1, wherein the integrated design environment comprises at least one scanning plug-in based on application code format.

3. The system of claim 1, wherein the at least one list of cloud platform dependencies comprises a first list source and a second list source.

4. The system of claim 3, wherein the first list source comprises a first list of cloud dependencies using Swagger definitions and the second list source comprises a second list of cloud dependencies using a dependency repository system.

5. The system of claim 1, wherein the application code is a Java class file, and
wherein the rules processing engine executes an algorithm that searches the Java class file for at least one import from dependencies of a specific cloud provider.

6. The system of claim 1, wherein the rules processing engine executes an algorithm that searches a POM file for dependency inclusion entries from a specific cloud provider.

7. The system of claim 1, wherein the rules processing engine executes an algorithm that searches codebase for APIs of a specific cloud provider.

8. The system of claim 1, wherein the application code is a Java class file, and
wherein the rules processing engine executes an algorithm that searches the Java class file for imports from a key list of database dependencies.

9. The system of claim 1, wherein the harvesting engine polls the at least one list of cloud platform dependencies to retrieve an appropriate dependencies list.

10. The system of claim 1, wherein the cloud platform portability determination further comprises a dependency location, service usage, pricing, API detection, portability effort and application dependencies.

11. A method for scanning application code to determine cloud platform portability, the method comprising the steps of:
receiving application code from an integrated design environment;
receiving at least one list of cloud platform dependencies from a harvesting engine;
receiving intermittent updates to the at least one list of cloud platform dependencies at a predetermined interval;
identifying dependency names and versions in the at least one list of cloud platform dependencies;
removing duplicates present in the at least one list of cloud platform dependencies;
performing, via a rules processing engine, an analysis between the received application code and the at least one list of cloud platform dependencies;
identifying one or more potential vendor lock-in dependencies in the application code based on the analysis;
generating, via the rules processing engine, a cloud platform portability determination based on the analysis, wherein the cloud platform portability determination comprises a portability index that represents a number of platform or product specific dependencies present in the application code; and
transmitting, to a graphical user interface, the cloud platform portability determination.

12. The method of claim 11, wherein the integrated design environment comprises at least one scanning plug-in based on application code format.

13. The method of claim 11, wherein the at least one list of cloud platform dependencies comprises a first list source and a second list source.

14. The method of claim 13, wherein the first list source comprises a first list of cloud dependencies using Swagger definitions and the second list source comprises a second list of cloud dependencies using a dependency repository system.

15. The method of claim 11, wherein the application code is a Java class file, and
wherein the rules processing engine executes an algorithm that searches the Java class file for at least one import from dependencies of a specific cloud provider.

16. The method of claim 11, wherein the rules processing engine executes an algorithm that searches a POM file for dependency inclusion entries from a specific cloud provider.

17. The method of claim 11, wherein the rules processing engine executes an algorithm that searches codebase for APIs of a specific cloud provider.

18. The method of claim 11, wherein the application code is a Java class file, and
wherein the rules processing engine executes an algorithm that searches the Java class file for imports from a key list of database dependencies.

19. The method of claim 11, wherein the harvesting engine polls the at least one list of cloud platform dependencies to retrieve an appropriate dependencies list.

20. The method of claim 11, wherein the cloud platform portability determination further comprises a dependency location, service usage, pricing, API detection, portability effort and application dependencies.

* * * * *